Figure 1:
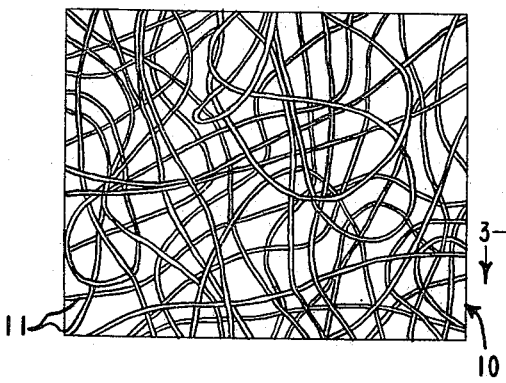
Figure 2:
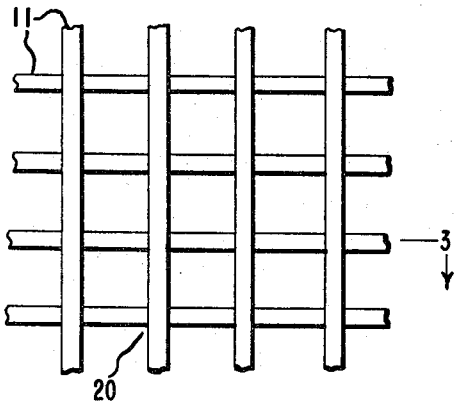
Figure 3:
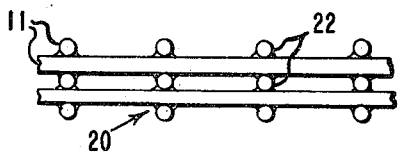
Figure 4:
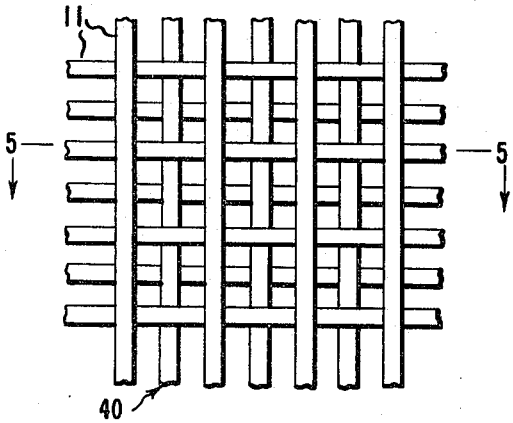
Figure 5:
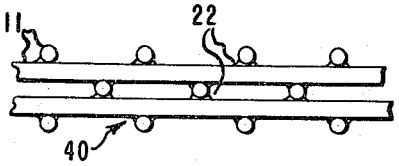
Figure 6:
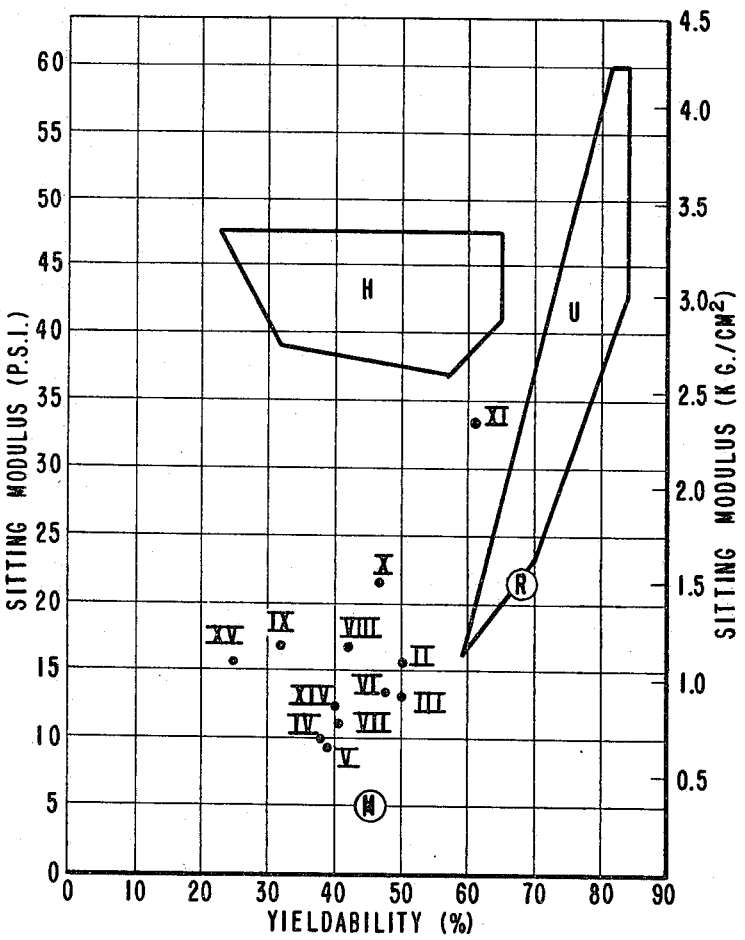
Figure 7:
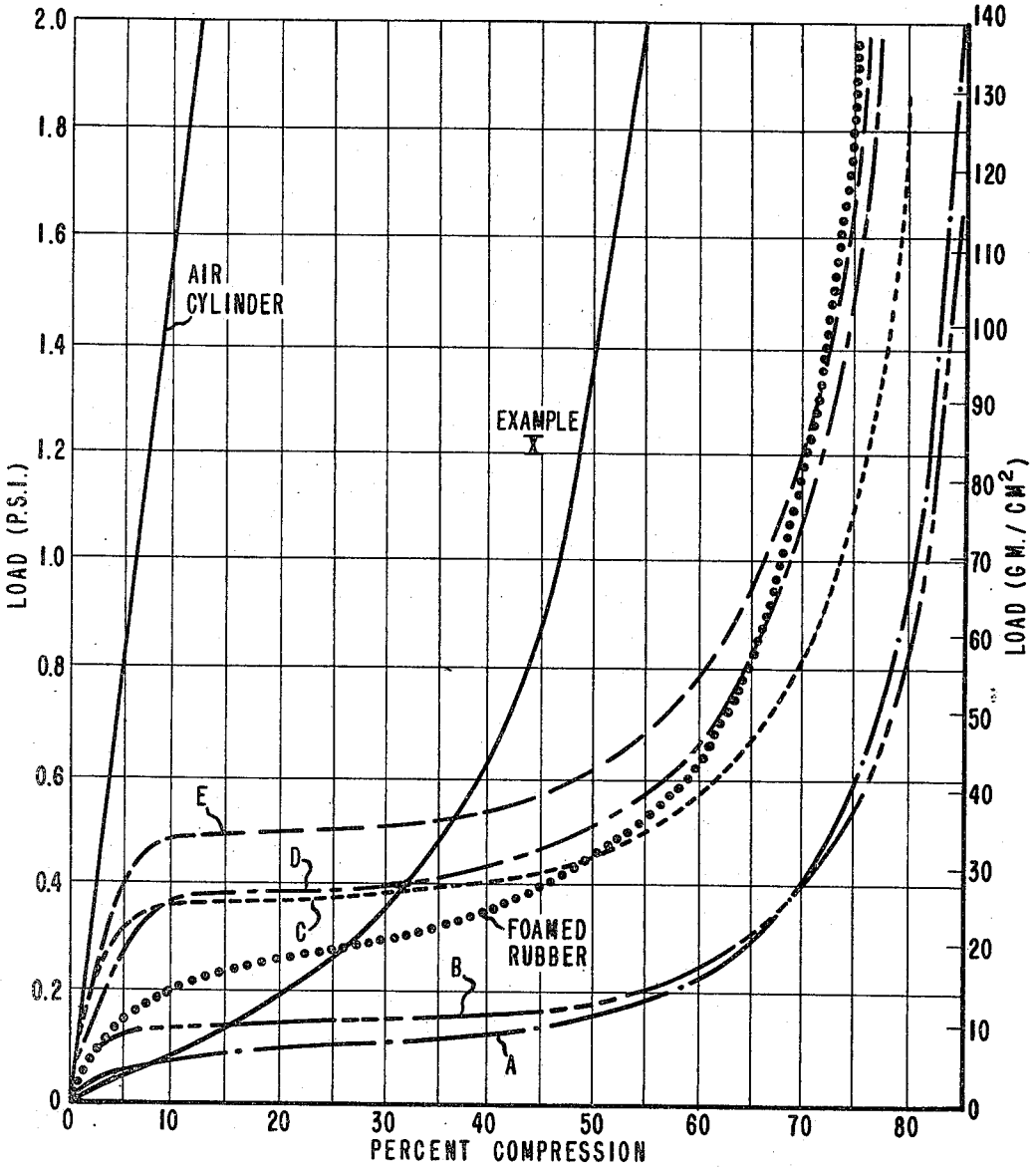

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 24, 1970

871 O.G. 1023

T871,007
SOFT FILAMENTARY CUSHIONING STRUCTURES

Conrad Rathmann Bohn, 111 Cambridge Drive, Wilmington, Del. 19803

Continuation of application Ser. No. 559,837, June 23, 1966. This application Sept. 19, 1969, Ser. No. 860,173
Int. Cl. D04h *3/00*
U.S. Cl. 161—170
3 Sheets Drawing. 48 Pages Specification

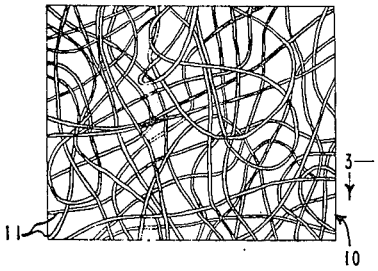

Soft cushioning structures suitable for use as cushioning elements in chairs, mattress covers and the like are made from filamentary material composed of polyhedral-shaped closed cells defined by filmy walls of a synthetic polymer, having a density of 0.005 to 0.05 gm./cc., and containing within said cells impermeant inflatant at a partial pressure of at least 50 mm. Hg to provide a total internal pressure at least as great as atmospheric pressure. A batt of such filamentary material is treated with an adhesive to bond the filaments at their cross-over points. The filaments occupy from 10 to 40% of the volume of the structure; 19–28% is preferred for mattress covers. The spaces between the filaments are not filled with adhesive, and the overall density of the cushioning structure is less than 0.016 gm./cc.

Feb. 24, 1970 C. R. BOHN T871,007

SOFT FILAMENTARY CUSHIONING STRUCTURES

Original Filed June 23, 1966 3 Sheets-Sheet 1

INVENTOR
CONRAD RATHMANN BOHN

BY Donald A. Hoes

ATTORNEY

INVENTOR
CONRAD RATHMANN BOHN

BY Donald A. Hoes
ATTORNEY

SOFT FILAMENTARY CUSHIONING STRUCTURES

Original Filed June 23, 1966 3 Sheets-Sheet 3

INVENTOR
CONRAD RATHMANN BOHN

BY Donald A. Hoes
ATTORNEY